United States Patent
Falkenstein

(10) Patent No.: US 9,047,365 B2
(45) Date of Patent: Jun. 2, 2015

(54) METHOD AND DEVICE FOR MONITORING THE SATISFACTORY FUNCTIONING OF AT LEAST ONE FIRST AND A SECOND COMPONENT OF A VEHICLE DRIVE TRAIN

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 13/983,249

(22) PCT Filed: Dec. 7, 2011

(86) PCT No.: PCT/EP2011/072042
§ 371 (c)(1),
(2), (4) Date: Aug. 1, 2013

(87) PCT Pub. No.: WO2012/103971
PCT Pub. Date: Aug. 9, 2012

(65) Prior Publication Data
US 2013/0311034 A1 Nov. 21, 2013

(30) Foreign Application Priority Data
Feb. 3, 2011 (DE) .......................... 10 2011 003 581

(51) Int. Cl.
| | | |
|---|---|---|
| *B60W 50/02* | (2012.01) | |
| *G06C 23/02* | (2006.01) | |
| *G07C 5/02* | (2006.01) | |
| *G06F 11/30* | (2006.01) | |
| *B60K 6/48* | (2007.10) | |

(Continued)

(52) U.S. Cl.
CPC .............. *G06F 11/3065* (2013.01); *G07C 5/02* (2013.01); *G06C 23/02* (2013.01);
(Continued)

(58) Field of Classification Search
CPC ............. B60W 2050/0017; B60W 2050/0041; B60W 2050/021; B60W 50/0205; G06C 15/44; G06C 23/00; G06C 23/02; G06C 23/08; G01M 15/00; G01M 15/02; G01M 15/04; G01M 15/042; G01M 15/044; G01M 99/00; G01M 99/004; G01M 99/008
USPC ........... 701/29.1, 31.7, 32.8, 32.9, 33.5, 33.7, 701/33.9, 34.2, 34.3, 34.4; 180/65.265, 180/65.275, 65.28, 65.285
See application file for complete search history.

(56) References Cited

U.S. PATENT DOCUMENTS

| | | | |
|---|---|---|---|
| 5,902,934 A * | 5/1999 | Sprague et al. ................. | 73/779 |
| 2005/0065690 A1* | 3/2005 | Ashizawa et al. ............... | 701/51 |

(Continued)

FOREIGN PATENT DOCUMENTS

| | | |
|---|---|---|
| DE | 102005055001 | 5/2007 |
| DE | 102005062870 | 7/2007 |

(Continued)

OTHER PUBLICATIONS

International Search Report for Application No. PCT/EP2011/072042 dated May 7, 2012 (3 pages).

*Primary Examiner* — John R Olszewski
*Assistant Examiner* — Gerrad A Foster
(74) *Attorney, Agent, or Firm* — Michael Best & Friedrich LLP

(57) ABSTRACT

The invention relates to a method for monitoring the proper functioning of at least one first and a second component (109, 110) of a vehicle drive train (100). The first and the second component (109, 110) each have an effect on the torque applied to the driveshaft (111) and are controlled for this purpose by a test signal (112, 113). The test signals (112, 113) are predetermined such that the effects of the first and the second component (109, 110) onto the torque applied to the driveshaft (111) cancel each other out if the first and the second component (109, 110) function properly. When the components (109, 110) function properly, the traveling comfort is not disturbed by an unexpected torque increase or torque decrease during the carrying out of this method. Any perturbation of the vehicle drive train (100) is therefore also avoided.

19 Claims, 2 Drawing Sheets

(51) Int. Cl.
*B60W 10/06* (2006.01)
*B60W 10/08* (2006.01)
*B60W 20/00* (2006.01)
*B60W 50/00* (2006.01)

(52) U.S. Cl.
CPC ........... *B60W 2050/021* (2013.01); *B60K 6/48* (2013.01); *B60W 10/06* (2013.01); *B60W 10/08* (2013.01); *B60W 20/00* (2013.01); *B60W 50/0205* (2013.01); *B60W 2050/0041* (2013.01); *B60W 2050/0088* (2013.01); *Y02T 10/56* (2013.01); *Y02T 10/6221* (2013.01); *Y02T 10/6286* (2013.01)

(56) References Cited

U.S. PATENT DOCUMENTS

| 2008/0129549 | A1* | 6/2008 | Farkas et al. | 341/11 |
| 2008/0210509 | A1* | 9/2008 | Fenkart et al. | 192/54.1 |

FOREIGN PATENT DOCUMENTS

| DE | 102007043607 | 3/2009 |
| DE | 102008000869 | 10/2009 |
| DE | 102008041108 | 2/2010 |
| DE | 102008064536 | 6/2010 |

* cited by examiner

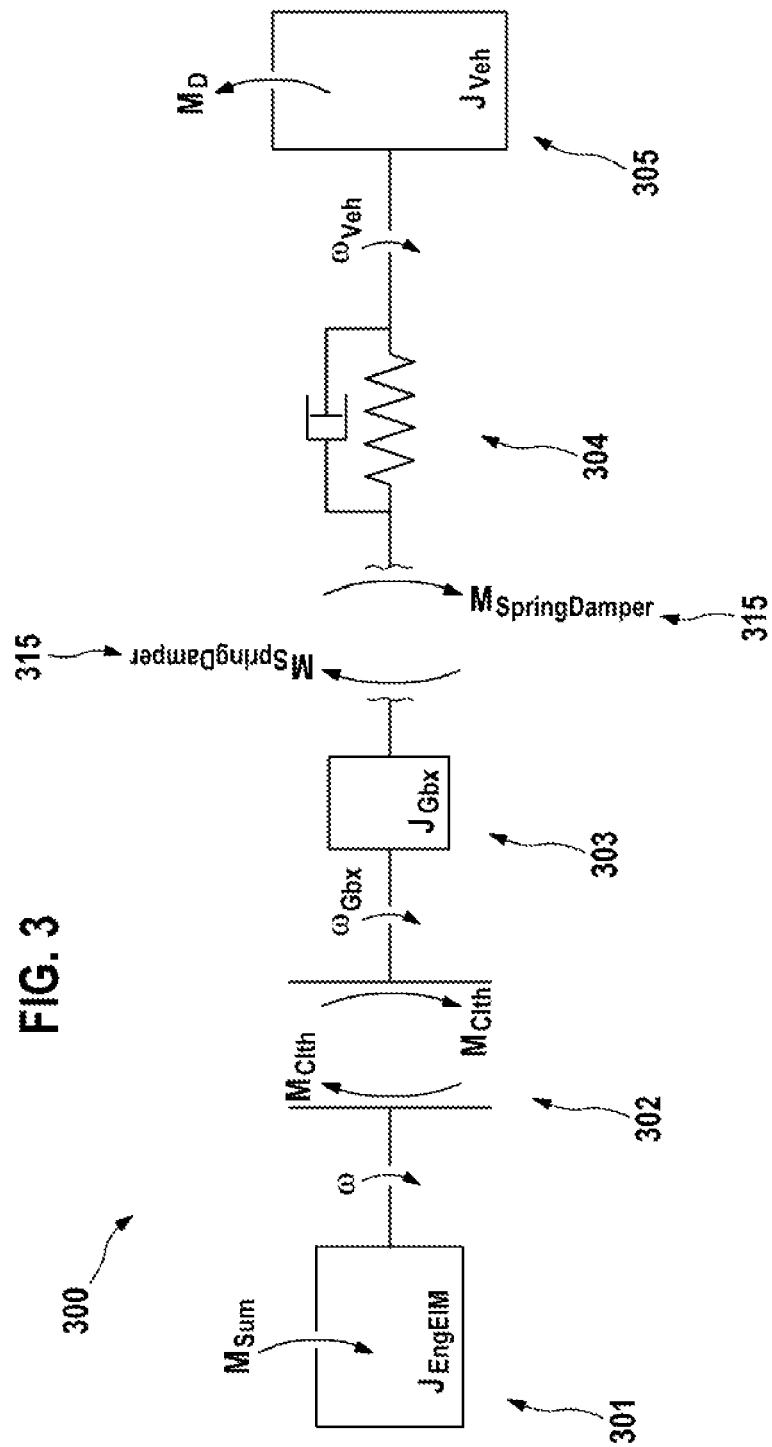

METHOD AND DEVICE FOR MONITORING THE SATISFACTORY FUNCTIONING OF AT LEAST ONE FIRST AND A SECOND COMPONENT OF A VEHICLE DRIVE TRAIN

BACKGROUND OF THE INVENTION

Actuating an internal combustion engine with an interference signal and evaluating the reaction of the internal combustion engine with the purpose of detecting the operating state of the internal combustion engine is known from the German patent application with the file reference 102008041108.6.

Vehicle drive trains are usually not equipped with sensors which permit direct measurement of currently generated drive torques. Fault-free operation of a drive assembly or satisfactory generation of torque therefore cannot be determined directly. In the case of internal combustion engines, satisfactory combustion, in particular at a low load, can only be detected with difficulty. Available measurement signals for internal combustion engines are usually not sufficient. In the case of unsatisfactory combustion there is a risk of unburnt fuel passing into the oil circuit or the exhaust section and causing damage or a fire, for example during relatively long downhill travel of a conventional vehicle.

In the case of hybrid motor vehicles, the vehicle drive train is composed of an internal combustion engine and at least one further drive assembly, for example an electric machine or a hydraulic engine. During driving with an internal combustion engine which is switched off it may be necessary to start the internal combustion engine, for example if the driver requests more power than the further drive assembly can supply. Since in the case of a hybrid vehicle the internal combustion engine can be entrained by a further drive assembly, the consequences described above are also possible if the satisfactory combustion does not start. In order to avoid these consequences it is necessary to monitor the satisfactory functioning of the components, of the drive assemblies and of the entire vehicle drive train and therefore to monitor the satisfactory generation of torque thereby. Negative effects on the driving comfort and the driving safety can be avoided in this context, even in the case of low assembly loading.

SUMMARY OF THE INVENTION

In the method according to the invention for monitoring the satisfactory functioning of at least a first and a second component of a vehicle drive train there is provision that the first component of a vehicle drive train is actuated with a first test signal, and the second component is actuated with a second test signal. The first component has a first effect on the torque applied to a driveshaft, as a function of the first test signal, and the second component has a second effect on the torque applied to the driveshaft, as a function of the second test signal. The test signals are predefined according to the invention in such a way that the effects of the first and of the second component on the torque applied to the driveshaft cancel one another out if the first and the second components function satisfactorily. In the case of unsatisfactory functioning, the effects of the first and of the second components do not cancel one another out on the basis of the two test signals. In this way, unsatisfactory functioning of at least one of the two components can be inferred on the basis of an unsatisfactory change in rotational speed or acceleration of the rotational speed, for example of a driveshaft in the drive train.

For this purpose, for example a first component is actuated with a first test signal in such a way that it outputs an increased torque to the driveshaft, and a second component is simultaneously actuated with a second test signal in such a way that said second component outputs a correspondingly reduced torque to the driveshaft. Since both components act jointly on the driveshaft, the effects cancel one another out.

It is advantageous in this context that in the case of satisfactory functioning of the components the driving comfort and the driving safety are not disrupted by an unexpected increase in torque or decrease in torque while this monitoring method is proceeding. Disruption of the vehicle drive train is therefore also avoided.

In addition, according to the invention a device for monitoring the satisfactory functioning of at least a first and a second component of a vehicle drive train is provided, wherein the first and second components each have an effect on the torque applied to a driveshaft. Means are provided which actuate the first component with a first test signal, and the second component with a second test signal. The first component has a first effect on the torque applied to a driveshaft, as a function of the first test signal, and the second component has a second effect on the torque applied to the driveshaft, as a function of the second test signal. The first and the second test signals are predefined by the means in such a way that the effects of the first and second components on the torque applied to the driveshaft cancel one another out if the first and second components are functioning satisfactorily. If the effects of the first and second components do not cancel one another out on the basis of the two test signals, unsatisfactory functioning of at least one of the at least two components is inferred.

In one development of the invention there is provision that a mathematical model which describes at least part of the vehicle drive train is used to calculate the respective effects of the components, and that deviations between the calculated effects and the effects detected by means of sensors are detected. The mathematical model can be implemented, in terms of control technology, as a dynamic model or as an observer model and/or an interference variable observer in order to model the behavior of the vehicle drive train without excitation by test signals and/or to model the behavior of the vehicle drive train with excitation by means of test signals. By comparing the modeled and observed variables (for example rotational speed or acceleration of the driveshaft) with variables which are determined on the real vehicle drive train, reactions of the components to the test signals are detected. This model takes into account, in particular, the different effect of the test signals on the assemblies, for example as a result of the actuation dynamics or the assembly dynamics (for example delayed flow buildup or flow decrease in the torque converter) or delays in the signal transmission (for example CAN delay) by the vehicle controller. A deviation of the effect of the components from their satisfactory functionality can be detected only if the satisfactory functionality is known as a function of the test signals and/or the respective operating state of the vehicle drive train on the basis of the calculated variables, on the one hand, and the variables detected by means of sensors, on the other. By comparing the calculated effects and the effects detected by means of sensors, a deviation of the components from their satisfactory functionality is advantageously detected.

In one development of the invention there is provision that in the case of unsatisfactory functioning, that is to say when the effects of the first and second components on the torque applied to the driveshaft do not cancel one another out and deviations are detected between the calculated effects and the effects detected by means of sensors, the actuation of at least one component for the further operation of the at least one component is changed, with the result that the unsatisfactory functionality of the component is at least partially compensated. An advantage of this refinement is that therefore even in the case of unsatisfactory functionality further operation of the vehicle drive train is made possible by taking into account the unsatisfactory functionality of the component.

In one development of the invention there is provision that the actuation of at least one component for the further operation of the at least one component is changed as a function of the detected deviation, with the result that the unsatisfactory functionality of the component is at least partially compensated. An advantage of this refinement is that in this way further operation of the vehicle drive train is made possible, even in the case of unsatisfactory functionality, by taking into account the unsatisfactory functionality of the component.

In one development of the invention there is provision that the actuation for the further operation of the component is changed in such a way that no deviation is detected during subsequent actuation of the first and second components with the test signals. By means of the changed actuation of the component, the unsatisfactory functionality of the component is compensated and the further operation of the vehicle drive train is made possible by taking into account the unsatisfactory functionality of the component.

There is therefore provision for the actuation of the component to be adapted. For example, adaptation of the actuation behavior of a transmitting element (starter clutch, torque converter, converter lockup clutch, transmission-internal clutch, . . . ) can take place in the slipping mode. In this context, information about the current actuation behavior of the assembly is acquired from the reaction of the assembly to the test signals.

In one development of the invention there is provision that during the actuation with the respective test signals a transmitting element of the vehicle drive train is operated in a slipping fashion. This transmitting element is arranged between one of the assemblies, which serve to drive the vehicle (for example an internal combustion engine, an electric machine or a hydraulic engine), and at least one driven vehicle wheel. The transmitting element can be implemented here, for example, by a starter clutch, a torque converter, a converter lockup clutch and/or a transmission-internal clutch. The technical background of this refinement is that the effects of the components on the torque applied to a driveshaft are not transmitted directly to at least one driven drive wheel. As a result, part of the vehicle drive train is decoupled from the at least one driven drive wheel or from a drive axle. As a result, negative effects of the monitoring function in the case of unsatisfactory functionality of at least one of the two components on the drive axle are avoided. As a result, an adverse effect on the driving comfort and the driving safety is also avoided. In addition, reactions to the test signals and resulting effects on the driveshaft such as, for example, changes in rotational speed of the driveshaft, and the generation of torque of the components, can therefore be detected satisfactorily. As a further advantage, the influence of the drive axle on the vehicle drive train is decoupled. Disruptions of the drive axle (for example owing to unevennesses in the driveway, drive train oscillations, transmission shift processes, ESP interventions or braking interventions) have less effect on the vehicle drive train to be monitored. As a result, the reactions of the vehicle drive train to the test signals are influenced less by the drive axle.

In a development of the invention there is provision that the test signals are determined in such a way that the effects of the components which are respectively actuated therewith are free of mean values. In figurative terms, free of mean values means that the effects which occur are distributed uniformly about an output state. An example of such effects could be torque fluctuations in the drive train of the vehicle. If these are plotted against the time in a coordinate system, they would be distributed uniformly about a zero line. For example, a sinusoidal profile which is distributed uniformly about a zero line would be free of mean values. The test signals are furthermore selected in such a way that the frequency of the effects which occur is so high that as a result of the actuation of the components with the test signals no additional acceleration or deceleration of the vehicle which can be perceived by the occupants of the vehicle is caused. These effects owing to these test signals cannot be felt by the occupants since the vehicle reacts only in a very delayed fashion and inertly to the test signals owing to the vehicle's high weight and the associated large moment of mass inertia. Even in the case of unsatisfactory functionality of a component, the vehicle would experience a high-frequency effect which is free of mean values and which advantageously minimizes disruption of the driving comfort. In particular, in this way a high level of driving safety can be achieved. A mathematical model (see above) of at least part of the drive train is also used, for example, for the determination of the test signals so that actuation of the component with these test signals in the case of satisfactory functioning of the components gives rise to the effects on the vehicle drive train which cancel one another out. In this context, for example physical limits of the components and delayed and/or worn reactions of the components to the actuation are taken into account.

In one development of the invention there is provision that the test signals are determined as a function of the current state of the vehicle drive train. The effects which result from the actuation with the test signals are different depending on the respective state of the vehicle drive train. For example, the test signals can excite disruptive drive train natural frequencies depending on the selected gear speed of a vehicle transmission. Correspondingly, the excitement with test signals should take place only in suitable states of the vehicle drive train so that the effects of the components on the driveshaft cancel one another out and advantageously do not adversely affect the operation of the vehicle.

In particular, the effects on the driveshaft are therefore reduced in the case of unsatisfactory functionality of a component.

In one development of the invention there is provision that during execution of the method according to the invention disruption of the first and second components and of the driveshaft of the vehicle drive train is avoided. Examples of such disruption both on the components actuated with test signals and on the coupled driveshaft are effects which cause an increase in torque or a decrease in torque at these components of the vehicle drive train. It is therefore possible, for example, for shifting of a transmission which is coupled to the driveshaft or to one of the components not to be carried out while the method is proceeding. An advantage of this refinement is that the effects of the components on the driveshaft are not falsified and therefore, if appropriate, the detection of deviations and their intensity is made possible.

In one development of the invention there is provision that the first or the second component is an assembly or part of an assembly from the group of the assemblies of a vehicle drive train (100), in particular an electric machine (103) and/or an internal combustion engine (101) and/or a hydraulic engine and/or a transmitting element (102, 104, 105). For example, in this way a component can represent an individual assembly. This can be, for example, a drive assembly, in particular an electric machine or an internal combustion engine of a hybrid vehicle or a transmitting element. Transmitting elements are, for example, a starter element and/or a clutch and/or a torque converter and/or a converter lockup clutch and/or a transmission-internal clutch and/or an automated starter clutch. A component can, for example, also represent an individual component of an assembly. This may be, for example, a throttle valve or an individual cylinder of an internal combustion engine or a winding of an electric machine which is connected, for example, to an electrical alternating voltage. As a result, the first and second components can each represent individual assemblies, individual components of one or two assemblies or, for example, an assembly and an individual component of an assembly. Actuation of individual drive assemblies with a test signal therefore brings about a reaction of this specific individual drive assembly.

Actuating an individual component of an assembly with a test signal therefore brings about a reaction of this specific individual component of an assembly. The satisfactory functioning of an individual component of an assembly can therefore be tested. Depending on the selection of test signals and components to be actuated, for example unsatisfactory combustion at individual cylinders in an internal combustion engine can be detected and suitable replacement measures initiated, for example switching off the affected cylinders. As a result, the satisfactory functionality of individual assemblies and individual parts of assemblies can therefore be monitored.

In particular, the use of the method and the device in parallel hybrids without a clutch between the internal combustion engine and electric machine or with a clutch which is operated only in the two states (closed or opened), for example a pulse coupling, is advantageous since diagnosis of the internal combustion engine during a controlled slipping mode of the clutch is not possible. In particular when the internal combustion engine starts after electric driving or after coasting with the internal combustion engine switched off, the use is advantageous.

The illustrated method and the device can be used in vehicles, in particular even in hybrid vehicles, electric vehicles or hydraulic vehicles and vehicles with a conventional internal combustion engine drive.

BRIEF DESCRIPTION OF THE DRAWINGS

The invention permits numerous embodiments. Two of these are explained in more detail with reference to the figures illustrated in the drawing, in which:

FIG. 3 shows a basic illustration of a simplified model of a parallel-hybrid vehicle drive train.

DETAILED DESCRIPTION

Figure 1:
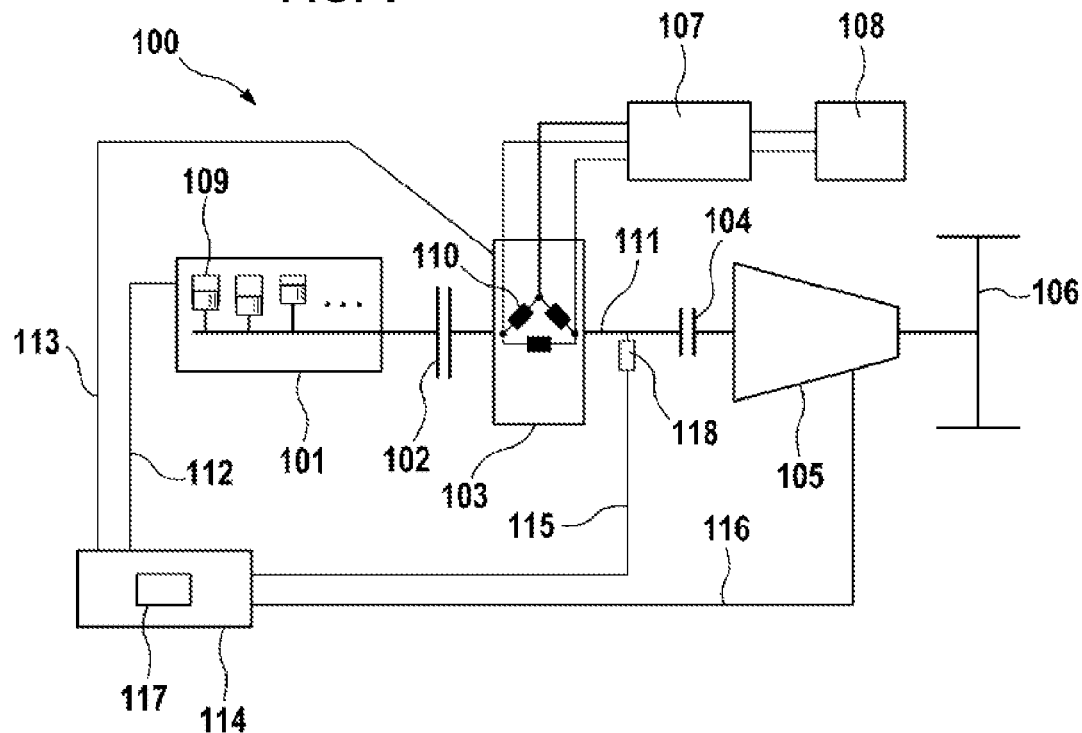
FIG. 1 shows a basic illustration of a vehicle drive train of a vehicle with a hybrid drive.

FIG. 1 shows a basic illustration of a vehicle drive train 100 of a vehicle with a hybrid drive. A first drive assembly, specifically an internal combustion engine 101, can be coupled via a clutch 102 to a second drive assembly, specifically an electric machine 103. The two drive assemblies act on a driveshaft 111 when the clutch 102 is closed. The driveshaft 111 can be coupled via a further transmitting element 104, for example a torque converter or a friction clutch, to a transmission 105. On the output side, the transmission 105 is mechanically coupled to a drive axle with drive wheels 106. A voltage source 108, for example a battery, makes available electrical energy to the electric machine 103 via an inverter 107. For this purpose, the inverter 107 converts the direct current of the voltage source 108 into three-phase current which flows in a phase-shifted fashion through each of the individual windings 110 of the electric machine 103, wherein the individual windings 110 are each connected to a phase. By means of signals 112, 113, 116, a control unit 114 actuates individual components, for example individual cylinders 109 of the internal combustion engine 101 or individual windings 110 which are each connected to a phase, or the assemblies themselves 101, 102, 103, 104, 105, 107, 108. Via transmitting means 115, for example transmitting lines, the control unit receives signals from sensors 118, for example a rotational speed sensor. Mathematical models 117 are present in the control unit in the form of software or hardware and they calculate the method of functioning of at least part of the vehicle drive train as a function of operating parameters 109, 110, 112, 113, 115, 116. In the control unit 114, the results of these calculations are used for monitoring the satisfactory functionality and for determining the further actuation of the vehicle drive train 100.

Figure 2:
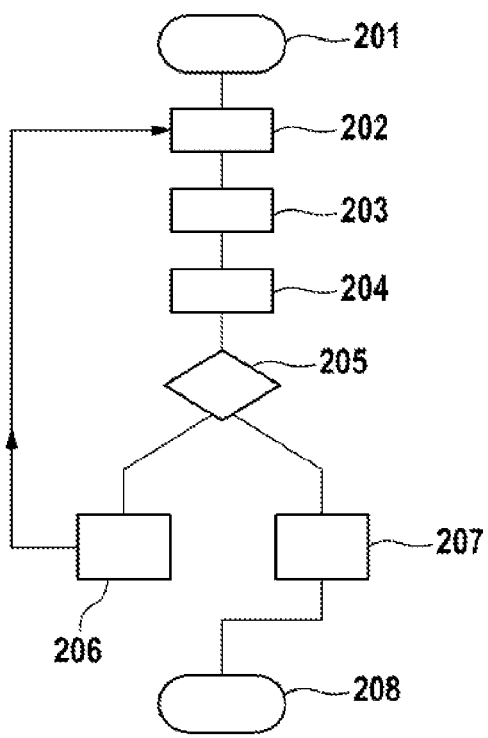
FIG. 2 shows a schematic flow chart of an exemplary embodiment of the method according to the invention.

FIG. 2 shows a schematic flow chart of an exemplary embodiment of the method according to the invention. The method starts in a first step 201. In a second step 202, the respective two test signals 112, 113 are transmitted to the components 109, 110, in particular in addition to the customary actuation or the actuation signals.

Subsequently, in a third step 203, signals of the sensors 118 are read in at the vehicle drive train. These signals are compared in a fourth step 204 with the results of the mathematical model of the vehicle drive train. If deviations are detected between the signals and the results of the mathematical model, unsatisfactory functioning of at least one of the at least two components is inferred. In this exemplary embodiment, in this case the method branches in a fifth step 205 to the sixth step 206 in which the further actuation of at least one component 109, 110 is carried on with modification as a function of the detected deviation. Subsequently, the method branches to the second step 202, and the method is carried out once more. During the subsequent repeated execution of the method it is tested whether the changed actuation leads to the satisfactory functioning of the component 109, 110. If no deviations are detected in the fourth step 204, the method branches in the fifth step 205 to a seventh step 207 in which the further actuation of the components 109, 110 is carried out without modification. The method ends with an eighth step 208. If, in particular, constant deviations are detected in the fourth step 204, the system branches to an error recovery routine (not explained in more detail), for example to setting the drive of the internal combustion engine.

FIG. 3 shows a simplified model of a parallel-hybrid vehicle drive train with an internal combustion engine 101 and an electric machine 103 which are combined to form a common rotational mass 301. Both drive the drive wheels (not illustrated) of the vehicle via a starter clutch 302 and an automated transmission 303. The transmission 303 is connected via a rotational spring/damper element 304 to a rotational mass 305 which models the equivalent inertia of the drive train parts, wheels and of the vehicle mass which is moved in a translatory fashion. The rotational spring/damper element 304 models elasticities in the drive train which are mostly determined by the stiffness of the sideshafts, that is to say the sideshafts of the differential transmission for the wheels.

The input side of the starter clutch 302 is connected to the rotational mass 301 of the internal combustion engine 101 and of the electric machine 103, and these components rotate at the angular speed ω which is determined by a rotational speed transmitter (not illustrated) and transferred to a vehicle controller. The common rotational mass 301 has the moment of mass inertia JEngElM, which is composed of the inertia of the internal combustion engine 101, of the electric machine 103 and of the input side of the starter clutch 302. The torque Mtotal, which is generated in total by the internal combustion engine 101 and the electric machine 103, and the torque MClth which is transmitted at the current time by the starter clutch 302 act on the rotational mass 301. The output side of the starter clutch 302 is connected to the automated transmission 303. Both components rotate at the angular speed ωGbx, which is also determined by a rotational speed transmitter (not illustrated) and transferred to the vehicle controller. The common rotational mass composed of the inertia of the transmission 303 and of the output side of the starter clutch 302 has a moment of mass inertia JGbx. The torque MClth which is transmitted at the current time by the starter clutch 302 and the torque MSpringDamper which is transmitted at the current time by the rotational spring/damper element 304 act on this rotational mass.

The rotational spring/damper element 304 is connected to a rotational mass 305 which models, with a moment of mass inertia JVeh, further drive train parts, wheels and the vehicle mass which is moved in a translatory fashion and rotates at an angular speed ωVeh. The torque MSpringDamper which is transmitted at the current time by the rotational spring/damper element 304 and a driving resistance torque MD, which models the rolling resistance, air resistance and gradient resistance etc., act on the rotational mass 305.

For the sake of simplicity, all the inertia, angular speeds and torques as well as further parameters are converted with the real transmission ratios of the transmission, axle transmission and/or the tire diameters and reduced, with the result that in FIG. 3 transmission ratios of i=1 are assumed.

Vehicles with a hybrid drive structure have an internal combustion engine 101 and usually an electric machine 103 as the second drive assembly. During the driving mode of the hybrid vehicle, the drive torque can therefore be applied by both drive assemblies.

In an exemplary embodiment according to FIG. 3, for example the starter clutch 302 is operated with slip control. This results in a differential angular speed Δω between the angular speed ω of the common rotational mass 301 of the internal combustion engine 101 and the electric machine 103 or the input side of the starter clutch 302 and the angular speed ωGbx of the common rotational mass 303 of the transmission and output side of the starter clutch 302:

$$\Delta\omega = \omega - \omega Gbx$$

The exemplary embodiment starts from a positive total torque Mtotal predefined for the operation of the vehicle. The differential angular speed Δω is then also positive. A slip controller is provided which compares the differential angular speed Δω with a setpoint value ΔωDes which is positive in this case, and influences the torque MClth, transmitted at the current time by the slipping starter clutch 302, by means of an actuation process or by means of actuation signals, by changing the contact pressure of the clutch linings by means of an actuator. If, for example, the differential angular speed Δω is higher than the positive setpoint value ΔωDes, the torque MClth, which is transmitted at the current time by the slipping starter clutch 302, is increased on the basis of the actuation signals of the slip controller, as a result of which the differential angular speed Δω decreases and approaches the setpoint value ΔωDes.

At transitions between a closed and a slipping starter clutch 302, the setpoint value ΔωDes is preferably predefined without jumps.

If the internal combustion engine 101 is then actuated according to the invention with a first test signal, for example the torque which is generated by the internal combustion engine 101 is influenced and therefore also the total torque Mtotal. As a result, the angular speed ω of the common rotational mass 301 of the internal combustion engine 101 and of the electric machine 103 changes, and therefore the rotational angular speed Δω also changes.

Without further measures, the slip controller would react to the additional acceleration of the common rotational mass 301 of the internal combustion engine 101 and of the electric machine 103 and would influence the torque MClth, transmitted at the current time by the starter clutch 302, associated with negative effects on the driving comfort.

According to the invention instead the effect of the first test signal on the differential angular speed Δω is calculated by using a mathematical model before the actuation by means of the first test signal. This effect is the basis for the determination of a second test signal. For example, the torque which is additionally generated on the basis of the first test signal is divided by the moment of mass inertia JEngElM of the common rotational mass 301 of the internal combustion engine 101 and of the electric machine 103 and subsequently integrated. This results in a differential angular speed ΔωTest. The second test signal is determined therefrom in such a way that the slip of the starter clutch 302 is influenced such that the effect of the first test signal on the differential angular speed Δω is compensated. In this example, for this purpose the second test signal is taken into account during the predefinition of the setpoint value ΔωDes for the slip controller. During satisfactory functioning of the drive, the differential angular speed Δω and the setpoint value ΔωDes then change to the same extent. During the monitoring of the satisfactory functioning, in each case one component is therefore actuated with the first test signal and a second component actuated with the second test signal simultaneously. It is therefore not necessary for the torque MClth transmitted at the current time by the slipping starter clutch 302 to be changed by the slip controller. The effects of the two test signals cancel one another out in their effect on the torque MClth transmitted at the current time by the slipping starter clutch 302. As a result, they also cancel one another out in their effect on the torque of a driveshaft of the common rotational mass 303 of the transmission and output side of the starter clutch 302 or of a driveshaft of the rotational mass 305, which models, inter alia, the equivalent inertia of the vehicle mass which is moved in a translatory fashion. If the effects of the two test signals do not cancel one another out and therefore do not correspond to the behavior predetermined by means of a mathematical model, it is inferred that there is unsatisfactory functioning of at least one of the at least two components. For example if an angular speed or angular acceleration which is determined at the vehicle drive train differs from one predetermined by means of the mathematical model.

In a further exemplary embodiment according to FIG. 3, for example the internal combustion engine 101 is actuated with a first test signal and the electric machine 103 is actuated with a second test signal.

The invention claimed is:
1. A method for monitoring a satisfactory functioning of at least a first and a second component (109, 110) of a vehicle drive train (100), wherein the first component (109) is actuated with a first test signal (112) and the second component (110) is actuated with a second test signal (113), wherein the first component (109) has a first effect on the torque applied to a driveshaft (111), as a function of a first test signal (112), and the second component (110) has a second effect on the torque applied to the driveshaft (111), as a function of a second test signal (113), the first effect and the second effect occurring simultaneously, characterized in that the first and second test signals (112, 113) are predefined in such a way that in the case of satisfactory functioning the effects of the first and second components (109, 110) on the torque applied to the driveshaft (111) cancel one another out.

2. The method as claimed in claim 1, characterized in that a mathematical model (117) which describes at least part of the vehicle drive train (100) is used to calculate the respective effects of the components (109, 110), and in that deviations between the calculated effects and the effects detected by means of sensors (118) are detected.

3. The method as claimed in claim 2, characterized in that the mathematical model (117) which describes at least part of the vehicle drive train (100) is used to calculate the respective effects of the components (109, 110) without the actuation with the respective test signals (112, 113), and in that deviations between the calculated effects and the effects detected by means of sensors (118) are detected.

4. The method as claimed in claim 1, characterized in that in the case of unsatisfactory functioning, when the effects of the first and second components (109, 110) on the torque applied to the driveshaft do not cancel one another out, the actuation of at least one component (109, 110) for the further operation of the at least one component (109, 110) is changed.

5. The method as claimed in claim 2, characterized in that the actuation of at least one component (109, 110) for the further operation of the at least one component (109, 110) is changed as a function of the detected deviation.

6. The method as claimed in claim 4 or 5, characterized in that the actuation for the further operation of the component (109, 110) is changed in such a way that no deviation is detected during subsequent actuation of the first and second components (109, 110) with the test signals (112, 113).

7. The method as claimed in claim 1, characterized in that during the actuation of the components (109, 110) with the respective test signals (112, 113) a transmitting element (102, 104) of the vehicle drive train (100), which is arranged between one of the assemblies (101, 103), which serve to drive the vehicle, and at least one driven vehicle wheel (106), is operated in a slipping fashion.

8. The method as claimed in claim 1, characterized in that the test signals (112, 113) are predefined in such a way that the effects of the components (109, 110) which are respectively actuated therewith are free of mean values.

9. The method as claimed in claim 1, characterized in that the test signals (112, 113) are determined as a function of the current state of the vehicle drive train (100).

10. The method as claimed in claim 1, characterized in that during the method disruption of the first and second components (109, 110) and of the driveshaft (111) of the vehicle drive train (100) is avoided.

11. The method as claimed in claim 8, characterized in that the disruption comprises shifting a transmission (105).

12. The method as claimed in claim 1, characterized in that the first or the second component is an assembly (101-105) or part of an assembly from the group of the assemblies of a vehicle drive train (100).

13. The method as claimed in claim 1, characterized in that the first or the second component (109, 110) is a cylinder (109) of an internal combustion engine (101), and/or in that the component is at least one winding (110) of an electric machine (103).

14. A device for monitoring a satisfactory functioning of at least a first and a second component (109, 110) of a vehicle drive train (100), wherein means (114) are provided which actuate the first component (109) with a first test signal (112) and the second component (110) with a second test signal (113),
wherein the first component (109) has a first effect on the torque applied to a driveshaft (111) as a function of a first test signal (112), and the second component (110) has a second effect on the torque applied to the driveshaft (111), as a function of a second test signal (113), the first effect and the second effect occurring simultaneously, characterized in that the means (114) predefines the first and second test signals (112, 113) in such a way that in the case of satisfactory functioning the effects of the first and second components (109, 110) on the torque applied to the driveshaft (111) cancel one another out.

15. The method as claimed in claim 1, characterized in that the first or the second component is an electric machine (103) and/or an internal combustion engine (101) and/or a hydraulic engine and/or a transmitting element (102, 104, 105).

16. The method as claimed in claim 1, characterized in that the first or the second component is an electric machine (103).

17. The method as claimed in claim 1, characterized in that the first or the second component is an internal combustion engine (101).

18. The method as claimed in claim 1, characterized in that the first or the second component is a hydraulic engine.

19. The method as claimed in claim 1, characterized in that the first or the second component is a transmitting element (102, 104, 105).

* * * * *